United States Patent [19]

Jin et al.

[11] Patent Number: 5,616,669

[45] Date of Patent: Apr. 1, 1997

[54] SOLUBLE CONDUCTIVE POLYMER MANUFACTURING METHOD THEREOF AND DISPLAY DEVICE EMPLOYING THE SAME

[75] Inventors: Sung-ho Jin, Suwon; Shin-woong Kang, Seoul, both of Rep. of Korea

[73] Assignee: Samsung Display Devices Co., Ltd., Kyungki-do, Rep. of Korea

[21] Appl. No.: 471,385

[22] Filed: Jun. 6, 1995

[30] Foreign Application Priority Data

Dec. 30, 1994 [KR] Rep. of Korea .................. 94-40136

[51] Int. Cl.⁶ ........................................... C08F 138/00
[52] U.S. Cl. ........................................... 526/285
[58] Field of Search ................................. 526/285

[56] References Cited

PUBLICATIONS

Akopyan, L. A.; Ambartsumyan, G. V., Ovakimyan, E. V.; Matsoyan, S. G. Vysokomol. Soedin, Ser. A 1977, 19(2), 271–4.

Chemical Abstract 86:140508x, 1977—Abstract of R.

Primary Examiner—Joseph L. Schofer
Assistant Examiner—Wu C. Cheng
Attorney, Agent, or Firm—Rothwell, Figg, Ernst & Kurz, P.C.

[57] ABSTRACT

A method of manufacturing a soluble conductive poly acetylene derivative represented by the following formula (I) including the steps of synthesizing a propargyl derivative by reacting a propargyl halogenide and an alkyne derivative and polymerizing the propargyl derivative in the presence of a transition metal catalyst. The thus obtained novel soluble conductive polymer can be used in a display device.

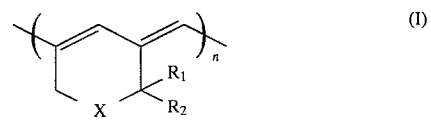

(wherein, X is oxygen atom or sulfur atom, $R_1$ and $R_2$ are independently selected from the group consisting of hydrogen, $C_2$–$C_{10}$ alkyl, $C_2$–$C_{10}$ alkenyl; or when one of $R_1$ and $R_2$ is phenyl, the other is hydrogen or $C_1$–$C_{10}$ alkyl, n is an integer between 50–200). The soluble conductive polymer of the present invention can be easily polymerized and has good stability and electrochromic characteristics when applied to display devices.

1 Claim, 4 Drawing Sheets

SOLUBLE CONDUCTIVE POLYMER MANUFACTURING METHOD THEREOF AND DISPLAY DEVICE EMPLOYING THE SAME

FIELD OF THE INVENTION

The present invention relates to a soluble conductive poly acetylene derivative, a manufacturing method thereof and a display device having improved oxidation stability and better response characteristics by employing the same.

BACKGROUND OF THE INVENTION

Recently, much concern has been concentrated on developing display devices using the electrochromic characteristics and the development of a novel conductive polymeric material having good processability, stability, response time, etc. has been treated as a very important research project. Now, two types of soluble conductive polymer are known, that is poly(3-alkyl thiophene) and polyaniline.

Among the 3-alkyl thiophenes, octyl substituted thiophene has been found to have good solubility. Octyl thiophene is oxidation-polymerized and washed with-methanol, to give a polymer soluble in chloroform, toluene, etc. Poly(octyl thiophene) can be doped by electrochemical or chemical method after solution casting. Recently, Macdiarmid et al. and Li et al. proposed manufacturing method for a solvent-soluble polyaniline. However, this kind of polymer is difficult to polymerize, and oxidation stability thereof is not sufficiently good for being applied to display devices.

Characteristics of electrochromic display using conductive polymers include absorption spectrum, optical density change, color changing speed, lifetime, etc. Oxidation and reduction reaction of conductive polymer are characterized by doping-dedoping reaction. Electrochemical doping reaction can be explained in the following equation.

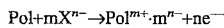

In this equation, Pol is a neutral polymer before doping, $X^{n-}$ is an anion, $Pol^{m+}$ is an oxidized polymer, $ne^-$ represents consumed electrons during the reaction and m and n are integers representing valence.

In the above equation, the colors of the polymer before and after oxidation are different. The response time of the display device is determined by the speed of oxidation and reduction of the conductive polymer in the electrochromic display using this property. The stability is determined by the number of reversible repetitions of the oxidation and reduction. The change of color when electric potential is changed is directly related to the current change, and the response time of the conductive polymer is concerned with the thickness of the polymer, applied electric potential and polymer structure. Generally, devices having a response time shorter than 100 msec are known to be applicable as display devices electrochromic display.

Manufacturing methods of display device using material having electrochromic characteristics include thermal evaporation ($WO_3$), sputtering ($WO_3$), anode oxidation ($Ir_2O_3$), sublimation (phthalocyanine) and deep coating (soluble polymer). The methods for forming a conductive polymer film on electrodes are anode oxidation and deep coating. In practice, since most conductive polymers are not soluble in solvents, the anode oxidation method is used. In this case, the thickness of the film can be adjusted by using the amount of electricity. However, only films having a thickness of 300 nm or less are used as for display devices.

The lifetime is the most important factor to be considered for the conductive polymers and it is determined by measuring the time until the electric characteristic reaches to about 50% of the original one. Mostly, the lifetime is about 1000 cycles in the absence of oxygen. Polypyrrole and polythiophene are known to be have stable lifetimes and recently, a polyaniline has been found to have a life time of about $10^4$ cycles. However, more development is still needed.

The present inventors completed the present invention after performing repeated experiments to solve the above-mentioned problems and to synthesize soluble conductive polymer showing even better characteristics than conventional conductive polymers in view of oxidation-reduction and stability to oxygen.

SUMMARY OF THE INVENTION

A first object of the present invention is to provide a soluble conductive poly acetylene derivative having increased oxidation stability and processability which is synthesized from a novel propargyl ether- or a sulfur-type monomer.

A second object of the present invention is to provide a method for manufacturing a soluble conductive poly acetylene derivative.

A third object is to provide a display device having improved oxidation stability and response characteristic by employing the soluble conductive polymer according to the present invention.

To accomplish the first object, there is provided in the present invention a soluble conductive poly acetylene derivative represented as the following formula (I):

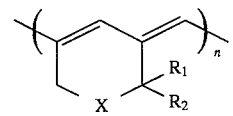

Here, X is oxygen atom or sulfur atom, $R_1$ and $R_2$ are independently selected from the group consisting of hydrogen, $C_2-C_{10}$ alkyl, $C_2-C_{10}$ alkenyl; or when one of $R_1$ and $R_2$ is phenyl, the other is hydrogen or $C_1-C_{10}$ alkyl, n is an integer between 50~200.

The preferred soluble conductive polymer represented as the formula (I) is Poly(2-propargyloxy-2-phenyl-3-butyne) polymer in which $CH_3$ and phenyl are at the α-position and X is O.

Preferably, molecular weight of the soluble conductive polymer is $2.0 \times 10^4 \sim 8.0 \times 10^4$ g/mol and distribution of the molecular weight of the soluble conductive polymer is 2.0~4.5.

The second object is accomplished by a manufacturing method of soluble conductive poly acetylene derivative represented as the formula (I), comprising the steps of synthesizing a propargyl derivative by reacting propargyl halogenide and an alkyne derivative, and polymerizing the propargyl derivative in the presence of a transition metal catalyst.

During the synthesis, either $MoCl_5$ or $WCl_6$ is preferably used as a transition metal catalyst and $(n-Bu)_4Sn$ or $EtAlCl_2$ is used as a co-catalyst. Propargyl bromide is preferably used as the propargyl halogenide and 2-phenyl-3-butyne-2-ol is preferably used as the alkyne derivative.

To accomplish the third object, there is provided in the present invention a display device having improved oxidation stability and response characteristics by employing a soluble conductive poly acetylene derivative represented as the following formula (I):

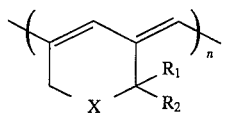

(I)

Here, X is oxygen atom or sulfur atom, $R_1$ and $R_2$ are independently selected from the group consisting of hydrogen, $C_1$–$C_{10}$ alkyl, $C_2$–$C_{10}$ alkenyl; or when one of $R_1$ and $R_2$ is phenyl, the other is hydrogen or $C_1$–$C_{10}$ alkyl, n is an integer between 50~200.

Preferably, the molecular weight of the soluble conductive polymer is $2.0 \times 10^4$–$8.0 \times 10^4$ g/mol and distribution of the molecular weight of the soluble conductive polymer is 2.0–4.5.

A display device including a propargyl ether-type derivative, poly(2-propargyloxy-2-phenyl-3-butyne), in which $CH_3$ and phenyl are at the α-position and X is O among the soluble conductive polymers represented by the above formula (I) is preferred.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
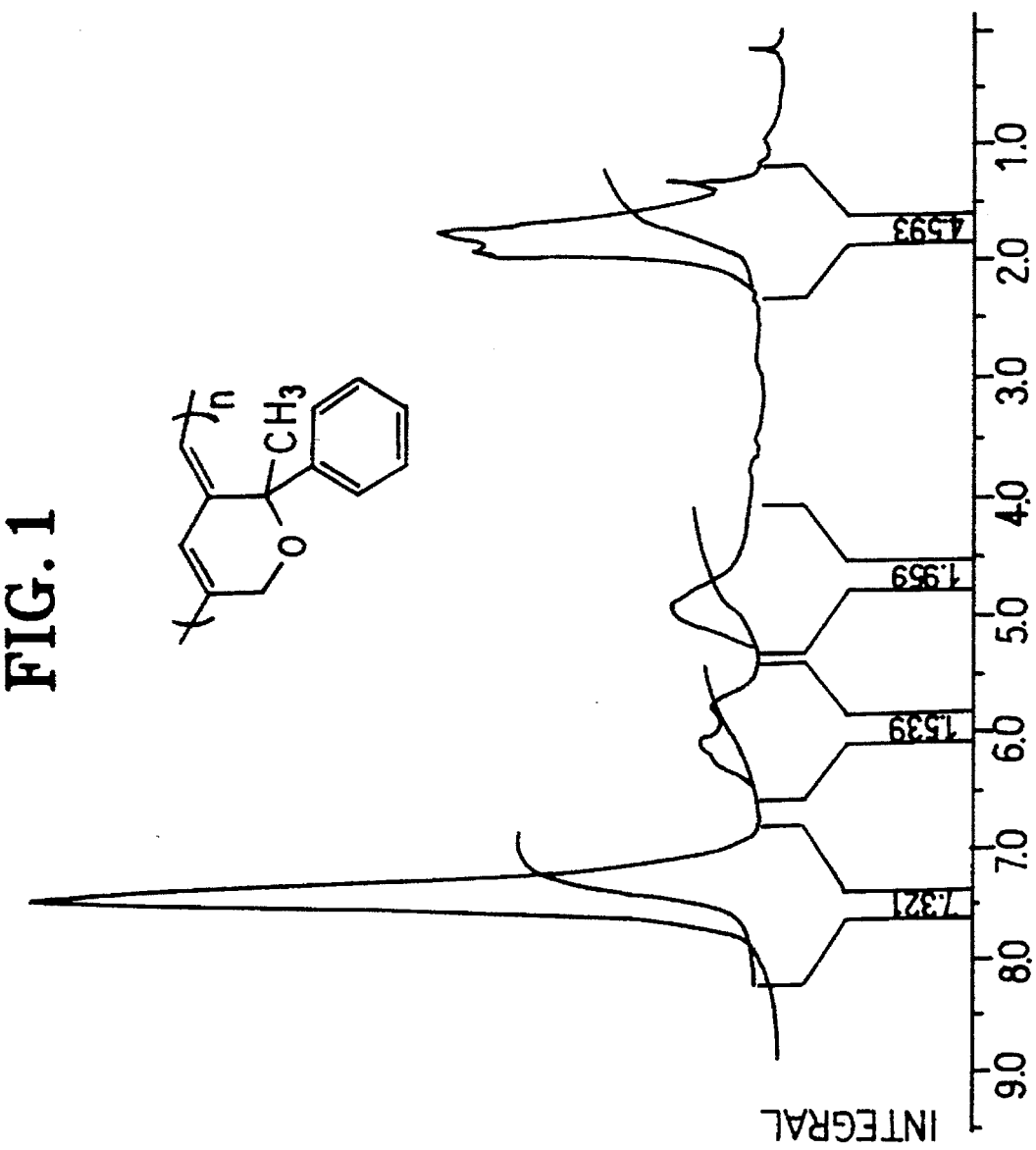
FIG. 1 is $^1$H-NMR spectrum of poly(2-propargyloxy-2-phenyl3-butyne).

The present invention will be described in detail referring to the preferred embodiments. However, the following embodiments are for explaining the present invention and the scope of the present invention is not limited to them.

EXAMPLE 1

Preparation of 2-propargyloxy-2-phenyl-3-butyne and $^1$H-NMR analysis thereof

1) Preparation of 2-propargyloxy-2-phenyl-3-butyne

The compound was prepared by the interfacial reaction of an aqueous layer and an organic layer as follows;

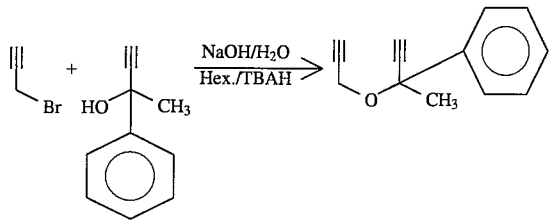

Propargyl bromide (22 g, 0.15 mol) was dissolved in 140 ml of n-hexane. This solution, 2-phenyl-3-butyne-2-ol (14.6 g, 0.1 mol), NaOH (60 g, 1.5 mol) and a catalytic amount of tetrabutyl ammonium hydrogen sulfate/water (120 ml) were mixed, reacted for 24 hours at an ambient temperature and refluxed for 30 minutes. After completion of the reaction, the mixture was cooled to an ambient temperature and water (100 ml) was added. The organic phase was extracted with 30 ml of n-hexane, three times. The extracted organic solvent was dried with anhydrous magnesium sulfate, filtered and evaporated to separate. b.p.: 61° C./0.5 mmHg; yield: 65%; MS: m/e 184 (parent), 129 (base).

2) $^1$H-NMR analysis of 2-propargyloxy-2-phenyl-3-butyne $^1$H-NMR analysis was carried out on 2-propargyloxy-2-phenyl-3-butyne prepared from the above process 1) and the result was as follows.

$^1$H-NMR ($CDCl_3$, δ, ppm) 1.78 (s, 3H, —$CH_3$), 2.4 (t, 1H, J=2.5, $CH_2C \equiv CH$), 2.8 (s, 1H, $\equiv CH$), 3.8 (d of d, 1H, J=14.7, —$CH_2$—), 4.3 (d of d, 1H, J=14.6, —$CH_2O$), 7.3–7.6 (m, 5H, phenyl): $^{13}C$-NMR ($CDCl_3$, δ, ppm) 32.7 (—$CH_3$—), 53.1 (—$CH_2O$—), 73.7 (—C—), 76.4, 76.6 (HC$\equiv$). 80.1 ($\equiv C$—$CH_2$).82.8 ($\equiv C$—C—), 125.7, 128.1.141.3 (phenyl).

EXAMPLE 2

Polymerization of dipropargyl ether derivative and characteristics of thus obtained polymer 1) Polymerization of dipropargyl ether derivative Preparation of catalyst and polymerization reaction were carried out in a nitrogen atmosphere and the polymerization condition are shown in the following Table 1. $MoCl_5$ prepared in 0.2 M solution was used as a catalyst. Catalyst, solvent and monomer were injected in 20 ml polymerization reactor and were reacted at 30° C. for 24 hours. The polymerization reaction was terminated by adding a small amount of methanol into the polymerization reactor. The thus obtained polymer was dissolved in chloroform and an excessive amount of methanol was added to precipitate. The precipitate was vacuum filtered and dried.

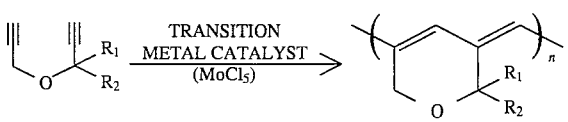

TABLE 1

Polymerization of dipropargyl ether derivative having α-substituent

| No. | $R_1$ | $R_2$ | initial concent- ration (M) | syn- thesis time (h) | yield (%) | M.W. (×10³) unit | M.W. distri- bution |
|---|---|---|---|---|---|---|---|
| 1 | H | H | 1.5 | 24 | 100 | | |
| 2 | H | $CH_3$ | 0.5 | 2 | 84 | 29.4 | 3.1 |
| 3 | H | phenyl | 0.25 | 24 | 92 | 73 | 4.0 |
| 4 | $CH_3$ | phenyl | 1 | 24 | 100 | 24.3 | 2.4 |
| 5 | cyclo- pentyl | cyclo- pentyl | 1 | 24 | 80 | 24.5 | 2.5 |

Various characteristics were examined for the polymer obtained by experiment 4 (X=O, $R_1$=$CH_3$, $R_2$=phenyl), poly(2-propargyloxy-2-phenyl-3-butyne).

2) ¹H-NMR and FT-IR analyses

FIG. 1 is ¹H-NMR analysis of poly(2-propargyloxy-2phenyl). From FIG. 1, it is known that acetylene peaks of 1.3 ppm and 2.7 ppm disappear and conjugated vinyl peak of 6.0–7.0 ppm appears according to the progress of synthesis.

Figure 2:
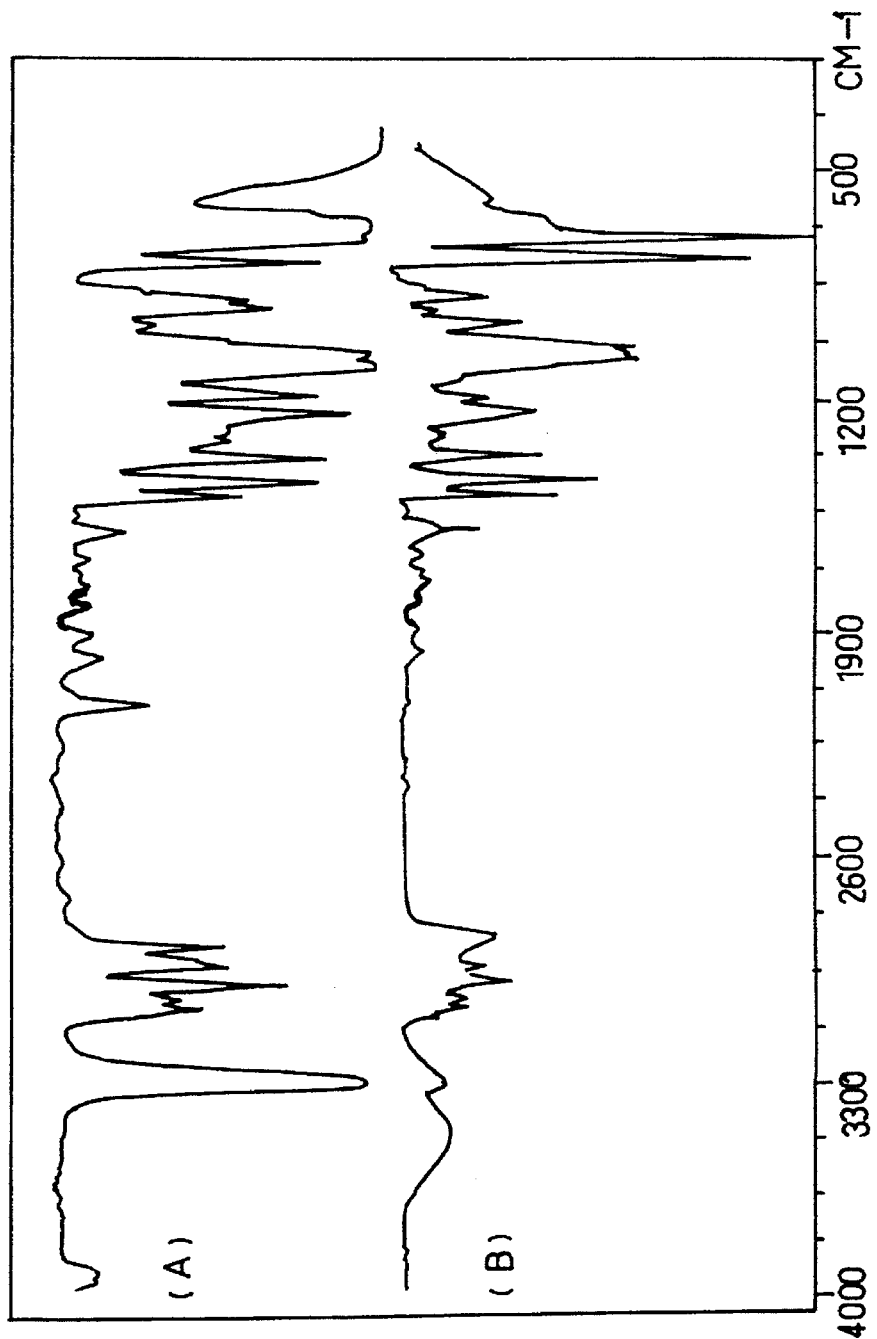
FIGS. 2A and 2B are FT-IR spectra of 2-propargyloxy-2-phenyl-3-butyne monomer (FIG. 2A) and poly(2-propargyloxy-2-phenyl-3-butyne) (FIG. 2B).

FIGS. 2A and 2B are the results of FT-IR for 2-propargyloxy-2-phenyl-3-butyne as a monomer having substituents of $CH_3$ and phenyl at the α-position and O at the X position (FIG. 2A), and for poly(2-propargyloxy-2-phenyl-3-butyne) polymer (FIG. 2B). Peaks of 3275 cm⁻¹ and 2150 cm⁻¹ for the acetylene functional group are shown in the case of the monomer, but are not shown in the case of the polymer. However, a new peak of 3275 cm⁻¹ appears in the case of the polymer.

3) Thermal properties and morphology of poly(2-propargyloxy-2-phenyl-3-butyne)

From the result of examing thermal properties according to the common method, it was found that the compound started to be decomposed at 200° C. and completely decomposed at 500° C. To examine morphology of the polymer, X-ray diffraction analysis was performed. Δ2θ/2θ (half-height width to diffraction angle) was 0.62. Generally, the value of the amorphous polymer is 0.35 or over and that of the crystalline polymer is 0.05 or less. Considering this, poly(2-propargyloxy-2-phenyl-3-butyne) is considered as an amorphous polymer.

EXAMPLE 3

Experiment on applicability as a display device

1) Examination on oxidation stability

Figure 3:
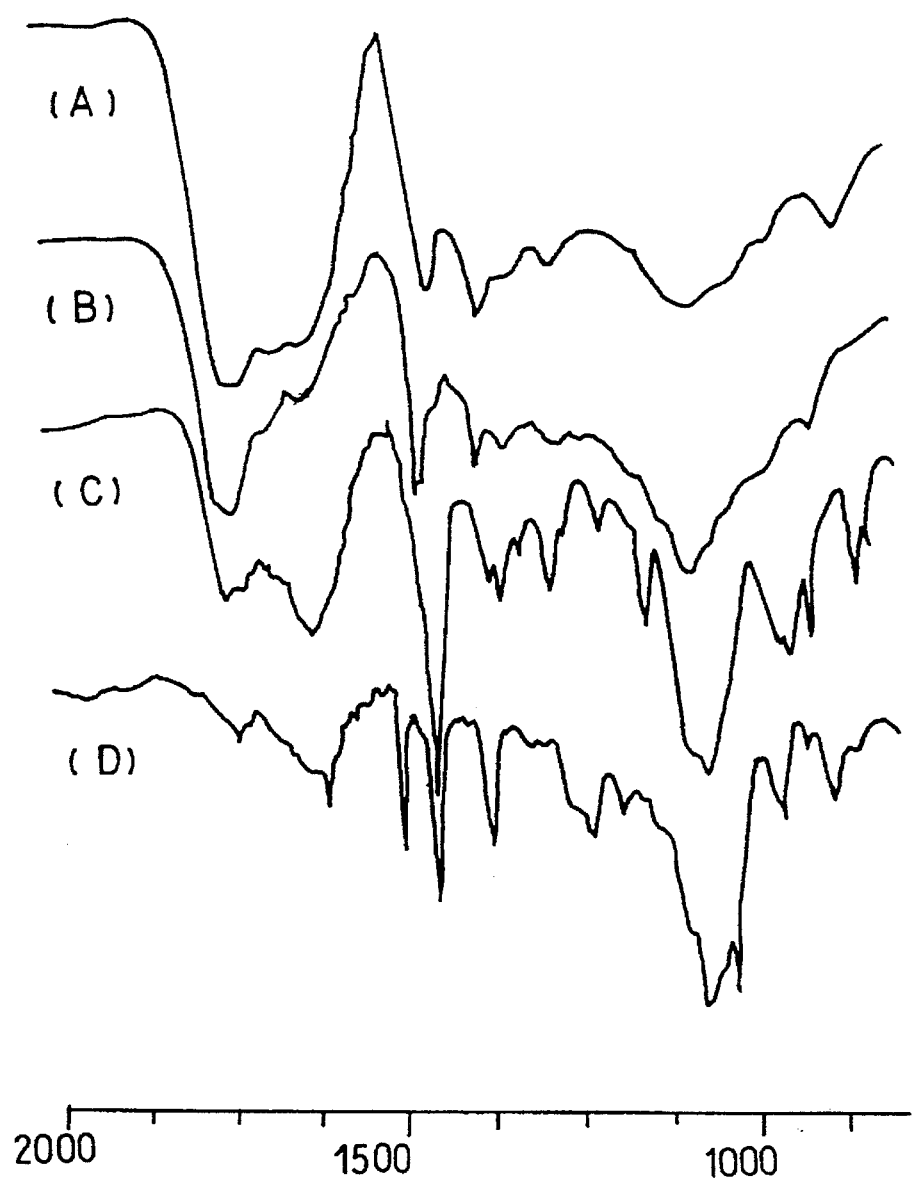
FIG. 3 illustrates FT-IR spectrum showing air oxidation stability according to the kind of substituent (a: $R_1$=H, $R_2$=$CH_3$, b: $R_1$=H, $R_2$=pentyl, c: $R_1$=$R_2$=cyclopentyl, d: $R_1$=H, $R_2$=phenyl).

Since stability to oxygen is very important when applied to a display device, the oxidation stability in air was examined by FT-IR spectrum. The result is shwon in FIG. 3. The oxidation stability was found to be dependent on the structure of the substituent introduced at the α-position. Monomer where the combination of ($CH_3$ and H) or (phenyl and H) is substituted at the α-position, X=O, has a carbonyl peak of 1700 cm⁻¹ after 1 week. However, 2-propargyloxy-2-phenyl-3-butyne monomer where the substituent at the α-position is $CH_3$ and phenyl, and X=O, has no absorption peak even after 1 month. Accordingly, this has been found to have a good stability to oxygen.

2) Examinations on electrochemical characteristics and electrochromic characteristics After dissolving poly(2-propargyloxy-2-phenyl-3-butyne) in ethyl acetate (EA), this solution was deep coated on a platinum plate in a thin film. Electrochemical characteristic were examined by cyclic voltammogram. 0.1 M acetonitrile solution of tetrabutyl ammonium perchlorate ($TBACIO_4$) was used as an electrolyte and an Ag/AgCl standard electrode was used as a reference electrode.

Figure 4:
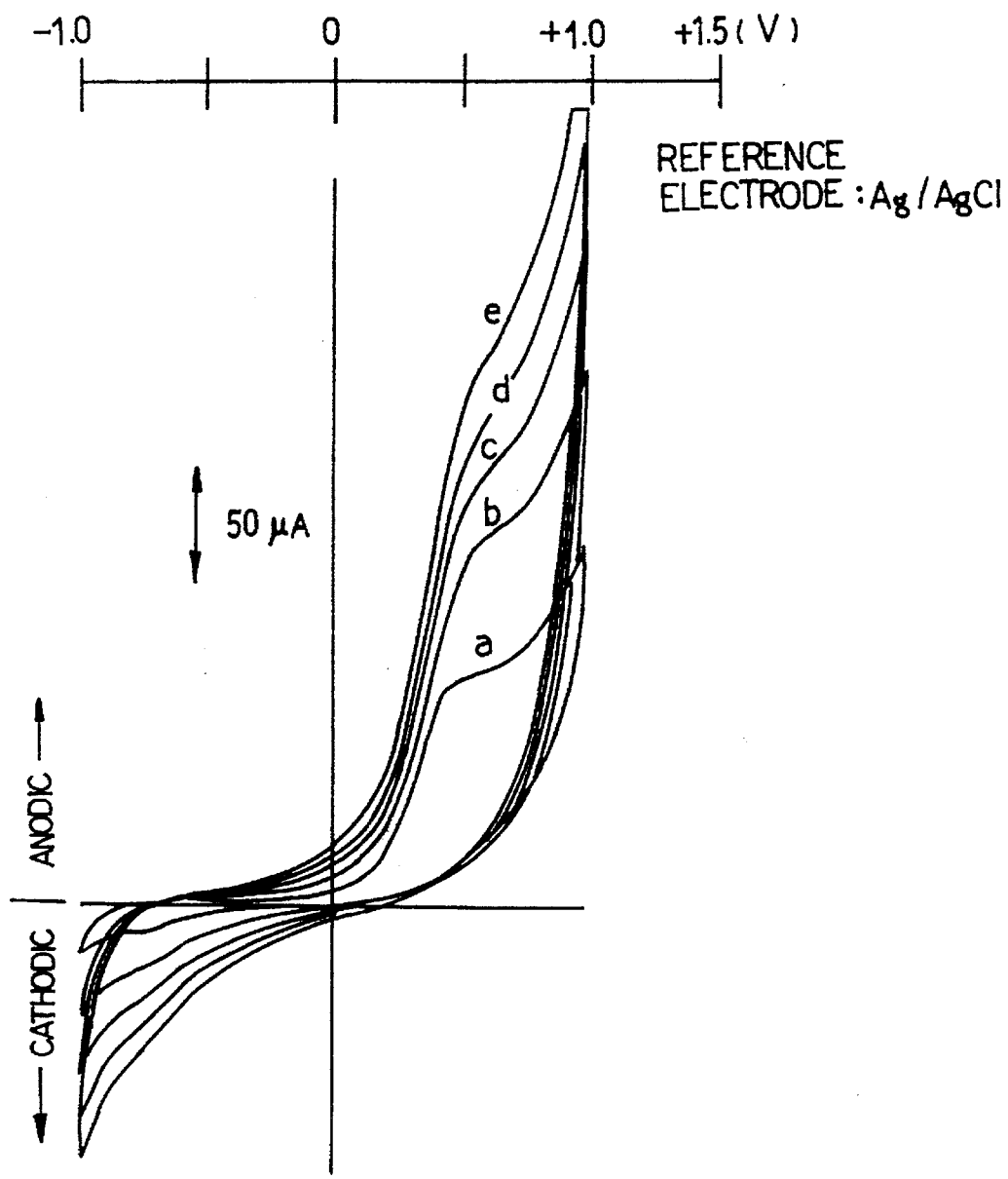
FIG. 4 illustrates cyclic voltammogram of poly(2-propargyloxy-2-phenyl-3-butyne) according to the scanning speed (a: 20 mV/s, b: 30 mV/s, c: 50 mV/s, d: 70 mV/s, e: 100 mV/s).

FIG. 4 illustrates a cyclic voltammogram measured while changing scanning speed. It is confirmed that the oxidation peak current is proportional to the scanning speed. This coincides with the electrochemical characteristics of typical conductive polymer.

To examine the electrochromic characteristics, poly(2-propargyloxy-2-phenyl-3-butyne) was coated on a platinum plate and UV-visible spectrum was measured while changing the electric potential from 0 to 1.4 V by an electrochemical method. A maximum absorption value of 400 nm was noted at reduced state 0 V showing a pale yellow color, while a maximum absorption value of 850 nm was noted at oxidized state 1.1 V showing a dark green color. From this result, it is known that the polymer shows a large difference in absorption in the visible region and has electrochromic characteristics.

As described above, the soluble conductive polymer of the present invention can be advantageously synthesized and has good stability and electrochromic characteristics. Accordingly, the display device employing the soluble conductive polymer of the present invention has good processability and oxidation stability and has improved response characteristic and lifetime.

What is claimed is:

1. The soluble conductive polymer poly(2-propargyloxy-2-phenyl-3-butyne).

* * * * *